United States Patent
Ouyang et al.

(10) Patent No.: US 11,929,488 B2
(45) Date of Patent: Mar. 12, 2024

(54) AB5-BASED HYDROGEN STORAGE ALLOY, ELECTRODE FOR NI-MH BATTERY, SECONDARY BATTERY, AND PREPARATION METHOD OF HYDROGEN STORAGE ALLOY

(71) Applicants: South China University of Technology, Guangzhou (CN); Sihui Dabowen Industrial Co., Ltd., Zhaoqing (CN); Guangdong Research Institute of Rare-Metal, Guangzhou (CN)

(72) Inventors: Liuzhang Ouyang, Guangzhou (CN); Cheng Tan, Guangzhou (CN); Min Zhu, Guangzhou (CN); De Min, Zhaoqing (CN); Hui Wang, Guangzhou (CN); Tongzhao Luo, Zhaoqing (CN); Fangming Xiao, Guangzhou (CN); Renheng Tang, Guangzhou (CN)

(73) Assignees: South China University of Technology, Guangzhou (CN); Sihui Dabowen Industrial Co., Ltd., Zhaoqing (CN); Guangdong Research Institute of Rare-Metal, Guangzhou (CN)

( * ) Notice: Subject to any disclaimer, the term of this patent is extended or adjusted under 35 U.S.C. 154(b) by 506 days.

(21) Appl. No.: 17/286,614

(22) PCT Filed: May 28, 2019

(86) PCT No.: PCT/CN2019/088704
§ 371 (c)(1),
(2) Date: Apr. 19, 2021

(87) PCT Pub. No.: WO2020/107832
PCT Pub. Date: Jun. 4, 2020

(65) Prior Publication Data
US 2022/0006070 A1    Jan. 6, 2022

(30) Foreign Application Priority Data

Nov. 30, 2018   (CN) .......................... 201811455993.6

(51) Int. Cl.
H01M 4/134    (2010.01)
C22C 1/02    (2006.01)
(Continued)

(52) U.S. Cl.
CPC ............. *H01M 4/134* (2013.01); *C22C 1/023* (2013.01); *C22C 19/03* (2013.01); *C22C 2202/04* (2013.01); *H01M 2004/027* (2013.01)

(58) Field of Classification Search
CPC ...... C22C 1/023; C22C 19/03; C22C 2202/04
See application file for complete search history.

(56) References Cited

U.S. PATENT DOCUMENTS 6,068,713 A    5/2000    Yamaguchi et al.

FOREIGN PATENT DOCUMENTS

| CN | 101740770 A | 6/2010 |
| CN | 103066251 A | 4/2013 |

(Continued)

OTHER PUBLICATIONS

International Search Report dated Sep. 5, 2019, Application No. PCT/CN2019/088704.

*Primary Examiner* — Brian R Ohara
*Assistant Examiner* — Patrick Marshall Greene
(74) *Attorney, Agent, or Firm* — The Dobrusin Law Firm, PC

(57) ABSTRACT

The present invention relates to a hydrogen storage alloy, an electrode for a Ni-MH battery, a secondary battery, and a method for preparing the hydrogen storage alloy. The chemical composition of the hydrogen storage alloy is expressed by the general formula $La_{(3.0\sim3.2)x}Ce_xZr_ySm_{(1-(4.11\sim4.2)x-y)}$ (Continued)

$Ni_zCo_uMn_vAl_w$, where x, y, z, u, v, w are molar ratios, and $0.14 \leq x \leq 0.17$, $0.02 \leq y \leq 0.03$, $4.60 \leq z+u+v+w \leq 5.33$, $0.10 \leq u \leq 0.20$, $0.25 \leq v \leq 0.30$, and $0.30 \leq w \leq 0.40$. The atomic ratio of the metal lanthanum (La) to the metal cerium (Ce) is fixed at 3.0 to 3.2, which satisfies the requirements of the overcharge performance of the electrode material. A side elements are largely substituted by samarium (Sm) element, that is, the atomic ratio of Sm on the A side is 25.6% to 42%, so as to solve the problem of shortened cycle life caused by the small amount of cobalt (Co) atoms. The equilibrium pressure is adjusted by the change in the ratio of Sm to La and Ce to satisfy the requirements of the charge and discharge dynamic performance of the electrode material. The nucleation rate of the solidification process is improved by the addition of zirconium (Zr) to the A side at an atomic ratio of 2% to 3%. The Ni-MH battery negative-electrode material obtained from the hydrogen storage alloy has high overcharge resistance, and good high-rate discharge performance and cycle stability.

19 Claims, 1 Drawing Sheet

(51) Int. Cl.
*C22C 19/03* (2006.01)
*H01M 4/02* (2006.01)

(56) References Cited

FOREIGN PATENT DOCUMENTS

| | | |
|---|---|---|
| CN | 107585790 A | 1/2018 |
| WO | 2020/107832 A1 | 6/2020 |

AB5-BASED HYDROGEN STORAGE ALLOY, ELECTRODE FOR NI-MH BATTERY, SECONDARY BATTERY, AND PREPARATION METHOD OF HYDROGEN STORAGE ALLOY

FIELD OF THE INVENTION

The present invention relates to the technical field of batteries and battery hydrogen-storage materials, in particular to an $AB_5$-based hydrogen storage alloy, an electrode for a Ni-MH battery, a secondary battery and a method for preparing the hydrogen storage alloy.

BACKGROUND OF THE INVENTION

A Ni-MH battery has advantages such as good safety, no pollution, high energy density, no memory effect, and reasonable price. It has become one of the most promising "green energy" batteries, and is widely used in hybrid cars, portable electric tools such as mobile power supplies, electronic products, and high-power equipment such as electric and hybrid vehicles. It is of great significance for mobile power supply, resource saving, energy peak shaving, environmental protection, etc.

The hydrogen-storage alloy negative-electrode materials currently studied mainly include $AB_5$ rare-earth nickel series hydrogen storage alloy, $AB_2$ Laves phase alloy, $AB_3$ alloy and $A_2B_7$ alloy, etc. The $AB_2$ Laves phase alloy has the characteristics of large hydrogen storage capacity; however, it also has some disadvantages such as difficult initial activation, poor high-rate discharge performance, and high cost, which need to be further studied and improved. The new high-capacity $AB_3$ and $A_2B_7$ alloys have higher discharge capacity; however, the problem of capacity decay of the alloy, the problem that magnesium is easily burnt during the melting process of the alloy to lead to difficult control of the composition, and the problem of corrosion and capacity decay easily caused due to the presence of magnesium still need to be solved. The $AB_5$ alloy was first used in electrode materials, and the researches on it have also been the most extensive. With its actual developed capacity having reached the theoretical limit, it has been successfully commercialized. However, for the $AB_5$ alloy with intrinsic high-power discharge capability, its actual high-power discharge capability, cycle life and overcharge resistance need to be improved, and its cost is also a key factor for the practical promotion.

Therefore, methods such as element substitution and heat treatment have been used to improve the comprehensive electrochemical properties of the $AB_5$ alloy. For the $AB_5$ alloy, La—Ce mixed rare earths without Pr and Nd are mostly used to replace the elements on the A side, so as to reduce the cost. On the B side, element substitution is mostly based on Mn and Al with no Co or low Co. In the past studies on the $AB_3$ and $A_2B_7$ alloys, there have been many studies on the substitution of Sm on the A side. From the literature reviewed, only Pan Hongge tried to add a very small amount of Sin (i.e., only 0.1 at %) to the $AB_5$ alloy, but did not observe any resulted special properties of the $AB_5$ alloy; that is, the addition of a small amount of Sm did not improve the $AB_5$ alloy.

In the process of implementing the present invention, the inventor found that there were at least the following problems in the prior art: In the $AB_5$ alloy, the addition of low Co element would shorten the cycle life of the Ni-MH battery, and it was not easy to adjust the equilibrium voltage by controlling the element ratio, difficult to satisfy the requirements of the charge and discharge dynamic performance of the electrode material; in addition, the role of Sm in the previous literature was unknown, and no report had been made on the fixed metal ratio of La:Ce; in the conventional $AB_5$ alloy, because there was no large amount of Sm added, and the heat treatment temperature was lower than 1000° C., it was difficult to achieve uniform distribution of the $AB_5$ alloy composition, and even its cycle life was affected.

CONTENTS OF THE INVENTION

In view of the technical problems existing in the prior art, the primary object of the present invention is to provide an $AB_5$-based hydrogen storage alloy, an electrode for a Ni-MH battery, a secondary battery, and a method for preparing the hydrogen storage alloy. For the above object, the present invention uses at least the following technical solution:

An $AB_5$-based hydrogen storage alloy is provided, whose chemical composition is represented by the following general formula,

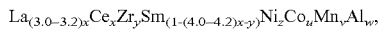

$La_{(3.0-3.2)x}Ce_xZr_ySm_{(1-(4.0-4.2)x-y)}Ni_zCo_uMn_vAl_w$, where x, y, z, u, v, w are molar ratios, and $0.14 \le x \le 0.17$, $0.02 \le y \le 0.03$, $4.60 \le z+u+v+w \le 5.33$, $0.10 \le u \le 0.20$, $0.25 \le v \le 0.30$, and $0.30 \le w \le 0.40$.

Further, $0.10 \le u \le 0.20$, $5.03 \le z+u+v+w \le 5.33$, and the hydrogen storage alloy is an $AB_5$ alloy, where A represents lanthanum, cerium, samarium and zirconium, B represents nickel, cobalt, manganese and aluminum, and the atomic ratio of Sm on the A side is 25.6% to 42%.

Further, $0.10 \le u \le 0.20$, $4.60 \le z+u+v+w \le 4.90$, and hydrogen storage alloy comprises an $A_2B_7$ phase and an $AB_5$ phase, where A represents lanthanum, cerium, samarium and zirconium, and B represents nickel, cobalt, manganese and aluminum.

Further, the hydrogen storage alloy is an $AB_5$ alloy catalyzed by $A_2B_7$, and the atomic ratio of Sm on the A side is 25.6% to 42%.

A method for preparing the $AB_5$-based hydrogen storage alloy is provided, comprising the following steps:

metals lanthanum, cerium, samarium, zirconium, nickel, cobalt, manganese and aluminum are subjected to low-vacuum induction melting at 1400° C. to 1600° C. for 0.5 to 3 h respectively at a molar ratio of 0.42 to 0.544, 0.14 to 0.17, 0.256 to 0.42, 0.02 to 0.03, 3.7 to 4.68, 0.10 to 0.20, 0.25 to 0.30, and 0.30 to 0.40, and then cooled to produce an alloy ingot;

and the alloy ingot is annealed in a protective-atmosphere furnace.

Further, the molar ratios of the metals lanthanum, cerium, samarium, zirconium, nickel, cobalt, manganese and aluminum are 0.42 to 0.544, 0.14 to 0.17, 0.256 to 0.42, 0.02 to 0.03, 4.25 to 4.68, 0.10 to 0.20, 0.25 to 0.30, and 0.30 to 0.40, respectively.

Further, the molar ratios of the metals lanthanum, cerium, samarium, zirconium, nickel, cobalt, manganese and aluminum are 0.420 to 0.544, 0.140 to 0.170, 0.256 to 0.420, 0.020 to 0.030, 3.700 to 4.200, 0.100 to 0.200, 0.250 to 0.300, and 0.300 to 0.400, respectively.

Further, the conditions of the low-vacuum induction melting include evacuating to $10^{-1}$ to $10^{-2}$ Pa, and then filling with argon to 0.01-0.07 MPa; the conditions of the annealing treatment include placing the alloy ingot in the protective-atmosphere furnace, evacuating to $10^{-1}$ to $10^{-2}$ Pa, then filling with argon to 0.05-0.08 MPa, and annealing at 1020° C. to 1100° C. for 1 to 10 h.

The electrode for the Ni-MH battery uses the hydrogen storage alloy as a hydrogen storage medium.

The secondary battery uses the electrode for the Ni-MH battery as a negative electrode.

Compared with the prior art, the present invention has at least the following beneficial effects:

1. The present invention uses metals lanthanum (La), cerium (Ce), zirconium (Zr), samarium (Sin), nickel (Ni), cobalt (Co), manganese (Mn) and aluminum (Al) to form an $AB_5$ hydrogen storage alloy, and fixes the ratio of lanthanum (La) to cerium (Ce) at 3.0-3.2 to satisfy the requirements of the overcharge performance of the electrode material; A side elements are largely substituted by samarium (Sin) element, that is, the atomic ratio of Sm on the A side is 25.6% to 42%, so as to solve the problem of shortened cycle life caused by the small amount of cobalt (Co) atoms; the equilibrium pressure is adjusted by the change in the ratio of Sm to La and Ce to satisfy the requirements of the charge and discharge dynamic performance of the electrode material; the nucleation rate of the solidification process is improved by the addition of zirconium (Zr) to the A side at an atomic ratio of 2% to 3%.

2. In the preparation method of the present invention, because there is no magnesium, and the temperature is higher than 1000° C. through heat treatment, the composition of the $AB_5$ alloy is uniformly distributed, and the corrosion resistance and cycle life are improved.

3. The multi-component alloying of nickel, cobalt, manganese and aluminum improves the corrosion resistance and economy of the electrode materials, and the B/A ratio is fine adjusted to B/A>5.03, so as to adjust the phase structure, avoid the formation of the $AB_3$ phase and $A_2B_7$ phase with a small excessive amount of the B-side elements, and improve the overcharge resistance, high-rate discharge performance and cycle performance of the alloy; by the adjustment of $4.60 \leq B/A \leq 4.90$, the phase structure is adjusted and a magnesium-free $A_2B_7$ catalytic phase is obtained, with the magnesium-free $A_2B_7$ catalytic phase having good cycle performance, achieving good dynamic properties while fully maintaining the main $AB_5$ phase, and improving the overcharge resistance, high-rate discharge performance and cycle performance of the alloy; the obtained $AB_5$ Ni-MH battery negative-electrode material has high overcharge resistance, and good high-rate discharge performance and cycle stability.

DETAILED DESCRIPTION OF THE EMBODIMENTS

Figure 1:
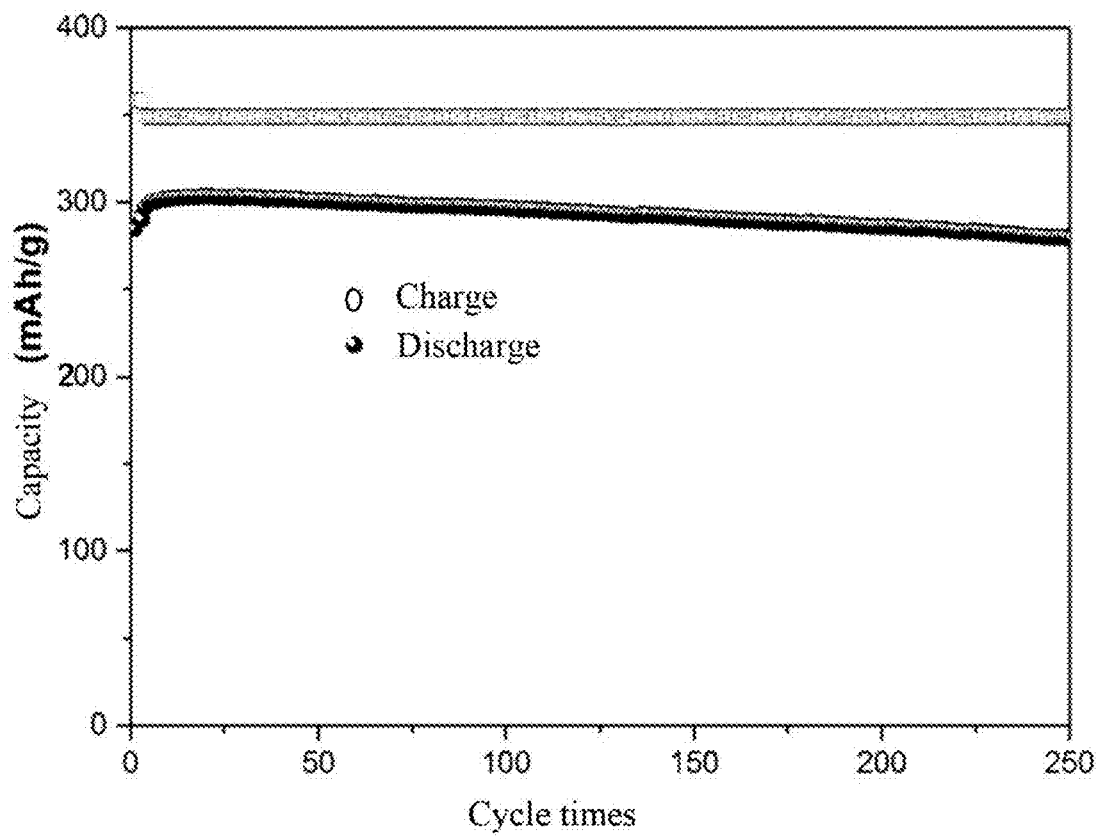
FIG. 1 shows a charge-discharge cycle life curve of the Ni-MH battery negative-electrode material in Example 1 of the present invention.

The present invention will be described in further detail below with reference to examples and drawings, but the embodiments of the present invention are not limited thereto.

The present invention uses metals lanthanum (La), cerium (Ce), zirconium (Zr), samarium (Sin), nickel (Ni), cobalt (Co), manganese (Mn) and aluminum (Al) to form an $AB_5$ hydrogen storage alloy, and fixes the ratio of lanthanum (La) to cerium (Ce) at 3.0-3.2 to satisfy the requirements of the overcharge performance of the electrode material; A side elements are largely substituted by samarium (Sin) element, that is, the atomic ratio of Sm on the A side is 25.6% to 42.0%, so as to solve the problem of shortened cycle life caused by the small amount of cobalt (Co) atoms; the nucleation rate of the solidification process is improved by the addition of zirconium (Zr) to the A side at an atomic ratio of 2% to 3%; the B-side elements include nickel (Ni), cobalt (Co), manganese (Mn), and aluminum (Al), and the atomic ratio of nickel (Ni):cobalt (Co):manganese (Mn):aluminum (Al) is (3.70 to 4.68):(0.10 to 0.20):(0.25 to 0.30):(0.30 to 0.40), so as to perform multi-component alloying to improve corrosion resistance and economy.

Example 1

A hydrogen storage alloy $La_{(3.0-3.2)x}Ce_xZr_y Sm_{(1-(4.0-4.2)x-y)}Ni_zCo_uMn_vAl_w$ was set to contain La 7.79 at %, Ce 2.49 at %, Zr 0.46 at %, Sm 5.39 at %, Ni 71.60 at %, Co 2.63 at %, Mn 4.08 at %, and Al 5.64 at %, wherein the elements La, Ce, Zr and Sm were A-side elements, and the elements Ni, Co, Mn and Al were B-side elements, thereby forming an $AB_5$ hydrogen storage alloy $La_{0.50}Ce_{0.16}Sm_{0.34}Zr_{0.03}Ni_{4.57}Co_{0.17}Mn_{0.26}Al_{0.36}$. The atomic ratio of La to Ce was fixed at about 3.1 to satisfy the requirements of the overcharge performance of the electrode material; A side elements are largely substituted by samarium (Sin) element, that is, the atomic ratio of Sm on the A side was about 33%, so as to solve the problem of shortened cycle life caused by the small amount of cobalt (Co) atoms. The equilibrium pressure was adjusted by the change in the ratio of Sm to La and Ce to satisfy the requirements of the charge and discharge dynamic performance of the electrode material. The nucleation rate of the solidification process was improved by the addition of zirconium (Zr) to the A side at an atomic ratio of 2.9%. The B-side elements included nickel (Ni), cobalt (Co), manganese (Mn), and aluminum (Al), and the atomic ratio of nickel (Ni):cobalt (Co):manganese (Mn):aluminum (Al) was 4.57: 0.17:0.26:0.36, so as to perform multi-component alloying to improve corrosion resistance and economy. The ratio of the A-side elements to the B-side elements was adjusted to B/A>5.03, so as to adjust the phase structure, and avoid the formation of the $AB_3$ phase and $A_2B_7$ phase with a small excessive amount of the B-side elements.

Preparation of hydrogen storage alloy $La_{0.50}Ce_{0.16}Sm_{0.34}Zr_{0.03}Ni_{4.57}Co_{0.17}Mn_{0.26}Al_{0.36}$ Step (1): placing respectively 350.7 g of La, 113.0 g of Ce, 262.7 g of Sin, 11.6 g of Zr, 1362.5 g of Ni, 50.2 g of Co, 72.7 g of Mn, and 49.3 g of Al with purity higher than 99.5% in a crucible of a ZG vacuum induction melting furnace, covering with a furnace lid, then evacuating to a vacuum degree of $10^{-1}$ Pa, filling with argon to a pressure of 0.07 MPa, and melting at 1550° C. for 2 h to obtain a molten metal liquid; pouring the molten metal liquid into a water-cooled ingot mold and cooling, and then discharging to obtain an alloy ingot.

Step (2): placing the alloy ingot obtained in the previous step in a protective-atmosphere furnace, evacuating to a vacuum degree of $10^{-1}$ Pa, filling with argon to a pressure of 0.08 MPa, and annealing at 1095° C. for 4 h, so as to ensure the homogeneity of the composition of the $AB_5$ alloy with high Sm substitution, avoid the formation of the $AB_3$ phase and $A_2B_7$ phase with a small excessive amount of the B-side elements, improve the corrosion resistance and cycle life, and finally obtain the hydrogen storage alloy $La_{0.50}Ce_{0.16}Sm_{0.34}Zr_{0.03}Ni_{4.57}Co_{0.17}Mn_{0.26}Al_{0.36}$.

Removing the oxide layer from the hydrogen storage alloy $La_{0.50}Ce_{0.16}Sm_{0.34}Zr_{0.03}Ni_{4.57}Co_{0.17}Mn_{0.26}Al_{0.36}$, then successively pulverizing, grinding and sieving, and selecting alloy powder with a particle size less than 200 meshes; accurately weighing 0.1 g of the alloy powder and 0.2 g of hydroxy nickel powder, mixing them evenly, then holding them at 15 MPa for 1 min by a powder tablet press to cold press them into an electrode pad with a diameter of Φ=10 mm, and then removing the floats with burrs removed and surface uncompressed; before the test, fixing the alloy electrode pad between two pieces of foamed nickel current collector, leading a nickel wire out, and making the foamed nickel in full contact with the alloy powder; then carrying out the performance test.

The test results showed that when 120 mA/g was used for the discharge test, the capacity was 302.4 mA·h/g, the capacity retention rate after 242 cycles was 91.14%, 1 C discharge capacity reached 96.7% of the maximum capacity, 3 C discharge capacity reached 85.7% of the maximum capacity, and 5 C discharge capacity reached 72.9% of the maximum capacity.

Examples 2-18

A low-vacuum induction melting method, a cooling method, and an annealing treatment were adopted to obtain a hydrogen storage alloy.

Each element was weighed according to the composition shown in Table 1 below, and the alloy ingot thereof was heat-treated by a ZG vacuum induction melting furnace in an argon atmosphere and then cooled, with the specific steps of the heat treatment and cooling being the same as those in step (1) of Example 1. Then the annealing treatment was carried out; in the specific process of the annealing treatment, except for the heat treatment temperature, the other process conditions were the same as those in step (2) of Example 1; the heat treatment temperature, time, 120 mA/g discharge capacity and 5 C discharge capacity percentage were shown in Table 1.

TABLE 1

| | Example 2 | Example 3 | Example 4 | Example 5 | Example 6 | Example 7 | Example 8 | Example 9 | Example 10 | Example 11 |
|---|---|---|---|---|---|---|---|---|---|---|
| La (g) | 340.3 | 363.0 | 351.7 | 427.0 | 414.9 | 427.0 | 340.3 | 363.0 | 351.7 | 364.6 |
| Ce (g) | 114.4 | 114.4 | 114.4 | 114.4 | 114.4 | 114.4 | 114.4 | 114.4 | 114.4 | 114.4 |
| Sm (g) | 386.0 | 361.5 | 373.7 | 292.2 | 305.3 | 292.2 | 386.0 | 361.5 | 373.7 | 359.7 |
| Zr (g) | 11.6 | 10.6 | 12.6 | 10.6 | 10.6 | 10.6 | 14.6 | 11.8 | 10.6 | 15.6 |
| Ni (g) | 1489.3 | 1489.3 | 1489.3 | 1472.1 | 1489.3 | 1489.3 | 1472.1 | 1472.1 | 1455.0 | 1472.1 |
| Co (g) | 51.6 | 51.6 | 51.6 | 68.8 | 51.6 | 51.6 | 68.8 | 51.6 | 51.6 | 51.6 |
| Mn (g) | 80.1 | 80.1 | 80.1 | 80.1 | 80.1 | 80.1 | 80.1 | 80.1 | 80.1 | 80.1 |
| Al (g) | 47.2 | 47.2 | 47.2 | 47.2 | 47.2 | 47.2 | 47.2 | 47.2 | 47.2 | 47.2 |
| Heat treatment temperature (° C.) | 1050 | 1090 | 1085 | 1095 | 1100 | 1080 | 1090 | 1050 | 1095 | 1100 |
| 120 mA/g discharge capacity | 309.2 | 301.3 | 304.6 | 306.2 | 302.4 | 306.1 | 309.2 | 303.6 | 306.8 | 307.7 |
| 5 C discharge capacity percentage | 73.0 | 74.0 | 73.6 | 73.5 | 73.8 | 73.1 | 73.0 | 74.0 | 73.4 | 73.1 |

| | Example 12 | Example 13 | Example 14 | Example 15 | Example 16 | Example 17 | Example 18 |
|---|---|---|---|---|---|---|---|
| La (g) | 414.9 | 427.0 | 340.3 | 363.0 | 351.7 | 364.6 | 351.7 |
| Ce (g) | 114.4 | 114.4 | 114.4 | 114.4 | 114.4 | 114.4 | 114.4 |
| Sm (g) | 305.3 | 292.2 | 386.0 | 361.5 | 373.7 | 359.7 | 373.7 |
| Zr (g) | 10.9 | 13.6 | 15.6 | 10.6 | 13.6 | 10.6 | 10.6 |
| Ni (g) | 1420.8 | 1437.9 | 1585.1 | 1557.7 | 1523.5 | 1482.4 | 1448.2 |
| Co (g) | 68.8 | 68.8 | 51.6 | 51.6 | 51.6 | 51.6 | 51.6 |
| Mn (g) | 80.1 | 80.1 | 80.1 | 80.1 | 80.1 | 80.1 | 80.1 |
| Al (g) | 47.2 | 47.2 | 47.2 | 47.2 | 47.2 | 47.2 | 47.2 |
| Heat treatment temperature (° C.) | 1050 | 1090 | 1085 | 1060 | 1090 | 1095 | 1100 |
| 120 mA/g discharge capacity | 301.5 | 306.3 | 308.4 | 301.7 | 305.9 | 307.6 | 306.5 |
| 5 C discharge capacity percentage | 73.9 | 73.4 | 73.0 | 74.0 | 73.6 | 73.6 | 73.5 |

Charge-discharge test was performed on the Ni-MH battery negative-electrode material $La_{0.50}Ce_{0.16}Sm_{0.34}Zr_{0.03}Ni_{4.57}Co_{0.17}Mn_{0.26}Al_{0.36}$ prepared in Example 1. With 120 mA/g used for the discharge test, the discharge capacity was 302.4 mA·h/g, the capacity retention rate after 242 cycles was 91.14%, 1 C discharge capacity reached 96.7% of the maximum capacity, 3 C discharge capacity reached 85.7% of the maximum capacity, and 5 C discharge capacity reached 72.9% of the maximum capacity, and the overcharge resistance was high. The charge-discharge cycle life curve was shown in FIG. 1. It could be seen from FIG. 1 that the alloy could still maintain more than 90% of the capacity after 250 cycles, and had excellent cycle performance.

In the hydrogen storage alloy in the above example, the ratio of lanthanum to cerium was fixed at 3.0 to 3.2, thus satisfying the requirements of the overcharge performance of the electrode material; A side elements are largely substituted by samarium (Sin) element, i.e., the atomic ratio of Sm on the A side was 25.6% to 42%, which could solve the problem of shortened cycle life caused by the small number of cobalt (Co) atoms; the equilibrium pressure was adjusted by the change in the ratio of Sm to La and Ce to satisfy the requirements of the charge and discharge dynamic performance of the electrode material; the nucleation rate of the solidification process was improved by the addition of zirconium (Zr) to the A side at an atomic ratio of 2% to 3%; the ratio of the A-side elements to the B-side elements in the above alloy was adjusted to 5.03≤B/A≤5.33, thereby adjusting the phase structure, and avoiding the formation of the $AB_3$ phase and $A_2B_7$ phase with a small excessive amount of the B-side elements.

In the following examples, based on the above-mentioned metal element ratio setting, the present invention also fixed the ratio of lanthanum to cerium to 3.0-3.2 to satisfy the requirements of the overcharge performance of the electrode material, A side elements are largely substituted by samarium (Sin) element, i.e., making the atomic ratio of Sm on the A side at 25.6% to 42.0%, so as to solve the problem of shortened cycle life caused by the small number of cobalt (Co) atoms, and fine adjusted the ratio of the A-side elements to the B-side elements to 4.60≤B/A≤4.90, thereby obtaining a magnesium-free $A_2B_7$ catalytic phase and adjusting the phase structure.

Example 19

Step (1): placing pure metals, 362.0 g of La, 120.0 g of Ce, 395.0 g of Sm, 11.4 g of Zr, 1429.0 g of Ni, 50.0 g of Co, 82.8 g of Mn, and 50.0 g of Al, in a crucible of a induction melting furnace (a ZG vacuum induction melting furnace, the same below), covering with a furnace lid, then evacuating to a vacuum degree of $10^{-1}$ Pa, filling with argon to 0.07 MPa, and melting at 1550° C. for 2 h to obtain a molten metal liquid; pouring the molten metal liquid into a water-cooled ingot mold and cooling, and then discharging to obtain an alloy ingot.

Step (2): placing the alloy ingot obtained in step (1) in a protective-atmosphere furnace, evacuating to a vacuum degree of $10^{-1}$ Pa, filling with argon to a pressure of 0.08 MPa, and annealing at 1020° C. for 10 h to obtain a $AB_5$ Ni-MH battery negative-electrode material based on the magnesium-free $A_2B_7$ catalysis, $La_{0.42}Ce_{0.14}Sm_{0.42}Zr_{0.02}Ni_{3.92}Co_{0.14}Mn_{0.24}Al_{0.30}$.

Removing the oxide layer from the above alloy block $La_{0.42}Ce_{0.14}Sm_{0.42}Zr_{0.02}Ni_{3.92}Co_{0.14}Mn_{0.24}Al_{0.30}$, then successively pulverizing, grinding and sieving, and selecting alloy powder with a particle size less than 200 meshes; weighing 0.1 g of the alloy powder and 0.2 g of hydroxy nickel powder, mixing them evenly, then holding them at 15 MPa for 1 min by a powder tablet press to cold press them into electrode pads with a diameter of Φ=10 mm, and then removing the floats with burrs removed and surface uncompressed; before the test, fixing the alloy electrode pad between two pieces of foamed nickel current collector, leading a nickel wire out, and making the foamed nickel in full contact with the alloy powder; then carrying out the performance test. With 0.4 C used for the discharge test, the discharge capacity was 325.7 mA·h/g, the capacity retention rate after 118 cycles was 97.2%, 1C discharge capacity reached 98.0% of the maximum capacity, 3 C discharge capacity reached 95.6% of the maximum capacity, and 5 C discharge capacity reached 72.9% of the maximum capacity.

Examples 20-26

A low-vacuum induction melting method, a cooling method, and an annealing treatment were adopted to obtain a hydrogen storage alloy.

Each element was weighed according to the composition shown in Table 2 below (the percentages in Table 2 were weight percentages), and the alloy ingot thereof was heat-treated by a ZG vacuum induction melting furnace in an argon atmosphere and then cooled, with the specific steps of the heat treatment and cooling being the same as those in step (1) of Example 19. Then the annealing treatment was carried out; in the specific process of the annealing treatment, except for the heat treatment temperature, the other process conditions were the same as those in step (2) of Example 19. The heat treatment temperature, time, rate discharge ratio and capacity were shown in Table 2 below.

TABLE 2

| | Ni | Co | Mn | Al | La | Ce | Zr | Sm | | Annealing process constant temperature/time/strong | Rate discharge ratio (%) and capacity (mAh/g) | | | | |
|---|---|---|---|---|---|---|---|---|---|---|---|---|---|---|---|
| | % | % | % | % | % | % | % | % | B/A | cooling | 0.4 C | 1 C | 3 CC | 5 C | 10 C |
| Example 19 | 57.14 | 2.00 | 3.31 | 2.00 | 14.46 | 4.78 | 0.46 | 15.80 | 4.60 | 1020/10/1020 | 100 325.7 | 98 319.1 | 95.6 311.4 | 94.2 306.8 | 87.8 286.1 |
| Example 20 | 57.14 | 2.00 | 3.31 | 2.00 | 14.46 | 4.78 | 0.46 | 15.80 | 4.60 | 1085/10/500 | 100 311 | 97.3 302.6 | 91.6 285 | 89 276.8 | 83.4 259.3 |
| Example 21 | 57.46 | 2.09 | 3.38 | 1.96 | 14.32 | 4.73 | 0.47 | 15.47 | 4.70 | 1020/10/1020 | 100 311.3 | 97.5 303.5 | 91.3 284.3 | 88.4 275.1 | 81 252.3 |
| Example 22 | 57.46 | 2.09 | 3.38 | 1.96 | 14.32 | 4.73 | 0.47 | 15.47 | 4.70 | 1085/10/500 | 100 305 | 97.2 296.6 | 90.9 277.2 | 88.2 269.2 | 81.2 247.8 |
| Example 23 | 58.53 | 2.08 | 3.23 | 1.94 | 16.56 | 4.65 | 0.44 | 12.52 | 4.84 | 1020/10/1020 | 100 315.1 | 96.7 304.8 | 92.6 291.7 | 90.1 284 | 81.4 256.5 |
| Example 24 | 5853 | 2.08 | 3.23 | 1.94 | 16.56 | 4.65 | 0.44 | 12.52 | 4.84 | 1085/10/500 | 100 317.4 | 96.3 305.6 | 91.3 289.8 | 88.5 280.8 | 78.4 248.8 |
| Example 25 | 58.53 | 2.08 | 3.23 | 1.94 | 16.56 | 4.65 | 0.44 | 12.52 | 4.84 | 1085/1/500 | 100 311.4 | 95.3 296.8 | 90.1 280.6 | 86.5 269.4 | 76.4 237.9 |
| Example 26 | 57.46 | 2.09 | 3.38 | 1.96 | 14.32 | 4.73 | 0.47 | 15.47 | 4.70 | 1085/5/500 | 100 301.2 | 96.1 289.5 | 90.1 271.4 | 86.2 259.6 | 77.2 232.5 |

Figure 2:
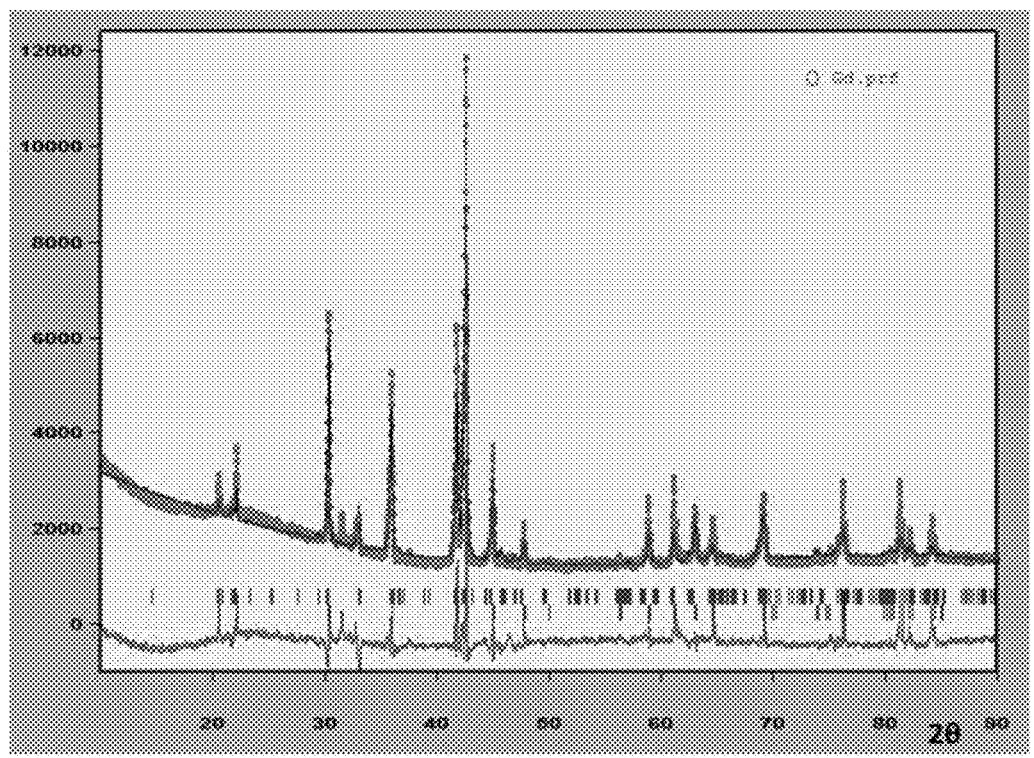
FIG. 2 shows an XRD test chart of the Ni-MH battery negative-electrode material in Example 20 of the present invention.

The XRD pattern and fitting curve test were performed on the Ni-MH battery negative-electrode material $La_{0.42}Ce_{0.14}Sm_{0.42}Zr_{0.02}Ni_{3.92}Co_{0.14}Mn_{0.24}Al_{0.30}$ obtained in Example 19, and the results were shown in FIG. 2, with the weight percentage of the $LaNi_5$ phase and the $La_2Ni_7$ phase being 90.3% and 9.7%, respectively.

It can be seen from Examples 19-26 that the atomic ratio of the metal lanthanum (La) to the metal cerium (Ce) was fixed at 3.0 to 3.2, which satisfied the requirements of the overcharge performance of the electrode materials; A side elements are largely substituted by samarium (Sm) element, i.e., making the atomic ratio of Sm on the A side at 25.6% to 42.0%, which solved the problem of shortened cycle life caused by the small number of cobalt (Co) atoms; zirconium (Zr) was added to the A-side at an atomic ratio of 2% to 3% (the A-side elements included lanthanum (La), cerium (Ce), samarium (Sin) and zirconium (Zr)), and the B-side elements included nickel (Ni), cobalt (Co), manganese (Mn) and aluminum (Al), with the atomic ratio of nickel (Ni):cobalt (Co):manganese (Mn):aluminum (Al) at (3.70-4.20):(0.10-0.20):(0.25-0.30):(0.30-0.40), thereby improving the corrosion resistance and economy by multi-component alloying; the ratio of the A-side elements to the B-side elements was adjusted to 4.60≤B/A≤4.90, thereby adjusting the phase structure and obtaining a magnesium-free $A_2B_7$ catalytic phase, with the magnesium-free $A_2B_7$ catalytic phase having good cycle performance, achieving good dynamic properties while fully maintaining the main $AB_5$ phase, and improving the overcharge resistance, high-rate discharge performance and cycle performance of the alloy; the obtained $AB_5$ Ni-MH battery negative-electrode material had high overcharge resistance, and good high-rate discharge performance and cycle stability.

The above examples are preferred embodiments of the present invention, but the embodiments of the present invention are not limited thereto, and any other alterations, modifications, substitutions, combinations, and simplifications made without departing from the spirit and principle of the present invention should all be equivalent replacements and included in the scope of protection of the present invention.

The invention claimed is:

1. An $AB_5$-based hydrogen storage alloy, characterized in that: its chemical composition is represented by the following general formula:

$$La_{(3.0-3.2)x}Ce_xZr_ySm_{(1-(4.0-4.2)x-y)}Ni_2Co_uMn_vAl_w,$$

where x, y, w are molar ratios, and 0.14≤x≤0.17, 0.02≤y≤0.03, 4.60≤z+u+v+w≤5.33, 0.10≤u≤0.20, 0.25≤v≤0.30, and 0.30≤w≤0.40.

2. The hydrogen storage alloy according to claim 1, characterized in that: 0.10≤u≤0.20, 5.03≤z+u+v+w≤5.33, and the hydrogen storage alloy is an $AB_5$ alloy, where A represents lanthanum, cerium, samarium and zirconium, B represents nickel, cobalt, manganese and aluminum, and the atomic ratio of Sm on the A side is 25.6% to 42%.

3. The hydrogen storage alloy according to claim 1, characterized in that: 0.10≤u≤0.20, 4.60≤z+u+v+w≤4.90, and the hydrogen storage alloy comprises an $A_2B_7$ phase and an $AB_5$ phase, where A represents lanthanum, cerium, samarium and zirconium, and B represents nickel, cobalt, manganese and aluminum.

4. The hydrogen storage alloy according to claim 1, characterized in that: the hydrogen storage alloy is an $AB_5$ alloy catalyzed by $A_2B_7$, and the atomic ratio of Sm on the A side is 25.6% to 42%.

5. A method for preparing the $AB_5$-based hydrogen storage alloy, characterized in that: the method comprises the following steps:

the metals lanthanum, cerium, samarium, zirconium, nickel, cobalt, manganese and aluminum are subjected to low-vacuum induction melting at 1400° C. to 1600° C. for 0.5 to 3 h respectively at a molar ratio of 0.42 to 0.544, 0.14 to 0.17, 0.256 to 0.42, 0.02 to 0.03, 3.7 to 4.68, 0.10 to 0.20, 0.25 to 0.30, and 0.30 to 0.40, and then cooled to produce an alloy ingot;

and the alloy ingot is annealed in a protective-atmosphere furnace.

6. The preparation method according to claim 5, characterized in that: the molar ratios of the metals lanthanum, cerium, samarium, zirconium, nickel, cobalt, manganese and aluminum are 0.42 to 0.544, 0.14 to 0.17, 0.256 to 0.42, 0.02 to 0.03, 4.25 to 4.68, 0.10 to 0.20, 0.25 to 0.30, and 0.30 to 0.40, respectively.

7. The preparation method according to claim 5, characterized in that: the molar ratios of the metals lanthanum, cerium, samarium, zirconium, nickel, cobalt, manganese and aluminum are 0.420 to 0.544, 0.140 to 0.170, 0.256 to 0.420, 0.020 to 0.030, 3.700 to 4.200, 0.100 to 0.200, 0.250 to 0.300, and 0.300 to 0.400, respectively.

8. The preparation method according to claim 5, characterized in that: the conditions of the low-vacuum induction melting include evacuating to $10^{-1}$ to $10^{-2}$ Pa, and then filling with argon to 0.01-0.07 MPa; the conditions of the annealing treatment include placing the alloy ingot in the protective-atmosphere furnace, evacuating to $10^{-1}$ to $10^{-2}$ Pa, then filling with argon to 0.05-0.08 MPa, and annealing at 1020° C. to 1100° C. for 1 to 10 h.

9. An electrode for a Ni-MH battery, characterized in that: the electrode uses the hydrogen storage alloy according to claim 1 as a hydrogen storage medium.

10. A secondary battery, characterized in that: this battery uses the electrode for a Ni-MH battery according to claim 9 as a negative electrode.

11. The hydrogen storage alloy according to claim 3, characterized in that: the hydrogen storage alloy is an $AB_5$ alloy catalyzed by $A_2B_7$, and the atomic ratio of Sm on the A side is 25.6% to 42%.

12. The preparation method according to claim 6, characterized in that: the conditions of the low-vacuum induction melting include evacuating to $10^{-1}$ to $10^{-2}$ Pa, and then filling with argon to 0.01-0.07 MPa; the conditions of the annealing treatment include placing the alloy ingot in the protective-atmosphere furnace, evacuating to $10^{-1}$ to $10^{-2}$ Pa, then filling with argon to 0.05-0.08 MPa, and annealing at 1020° C. to 1100° C. for 1 to 10 h.

13. The preparation method according to claim 7, characterized in that: the conditions of the low-vacuum induction melting include evacuating to $10^{-1}$ to $10^{-2}$ Pa, and then filling with argon to 0.01-0.07 MPa; the conditions of the annealing treatment include placing the alloy ingot in the protective-atmosphere furnace, evacuating to $10^{-1}$ to $10^{-2}$ Pa, then filling with argon to 0.05-0.08 MPa, and annealing at 1020° C. to 1100° C. for 1 to 10 h.

14. An electrode for a Ni-MH battery, characterized in that: the electrode uses the hydrogen storage alloy according to claim 2 as a hydrogen storage medium.

15. An electrode for a Ni-MH battery, characterized in that: the electrode uses the hydrogen storage alloy according to claim 3 as a hydrogen storage medium.

16. An electrode for a Ni-MH battery, characterized in that: the electrode uses the hydrogen storage alloy according to claim 4 as a hydrogen storage medium.

17. A secondary battery, characterized in that: this battery uses the electrode for a Ni-MH battery according to claim 14 as a negative electrode.

18. A secondary battery, characterized in that: this battery uses the electrode for a Ni-MH battery according to claim 15 as a negative electrode.

19. A secondary battery, characterized in that: this battery uses the electrode for a Ni-MH battery according to claim 16 as a negative electrode.

* * * * *

UNITED STATES PATENT AND TRADEMARK OFFICE
CERTIFICATE OF CORRECTION

PATENT NO. : 11,929,488 B2
APPLICATION NO. : 17/286614
DATED : March 12, 2024
INVENTOR(S) : Liuzhang Ouyang et al.

It is certified that error appears in the above-identified patent and that said Letters Patent is hereby corrected as shown below:

In the Claims

Column 9, Line 31, Claim 1, delete "where x, y, w are" and insert --where x, y, z, v, w are--

Signed and Sealed this
Seventh Day of May, 2024

Katherine Kelly Vidal
*Director of the United States Patent and Trademark Office*